Patented July 31, 1951

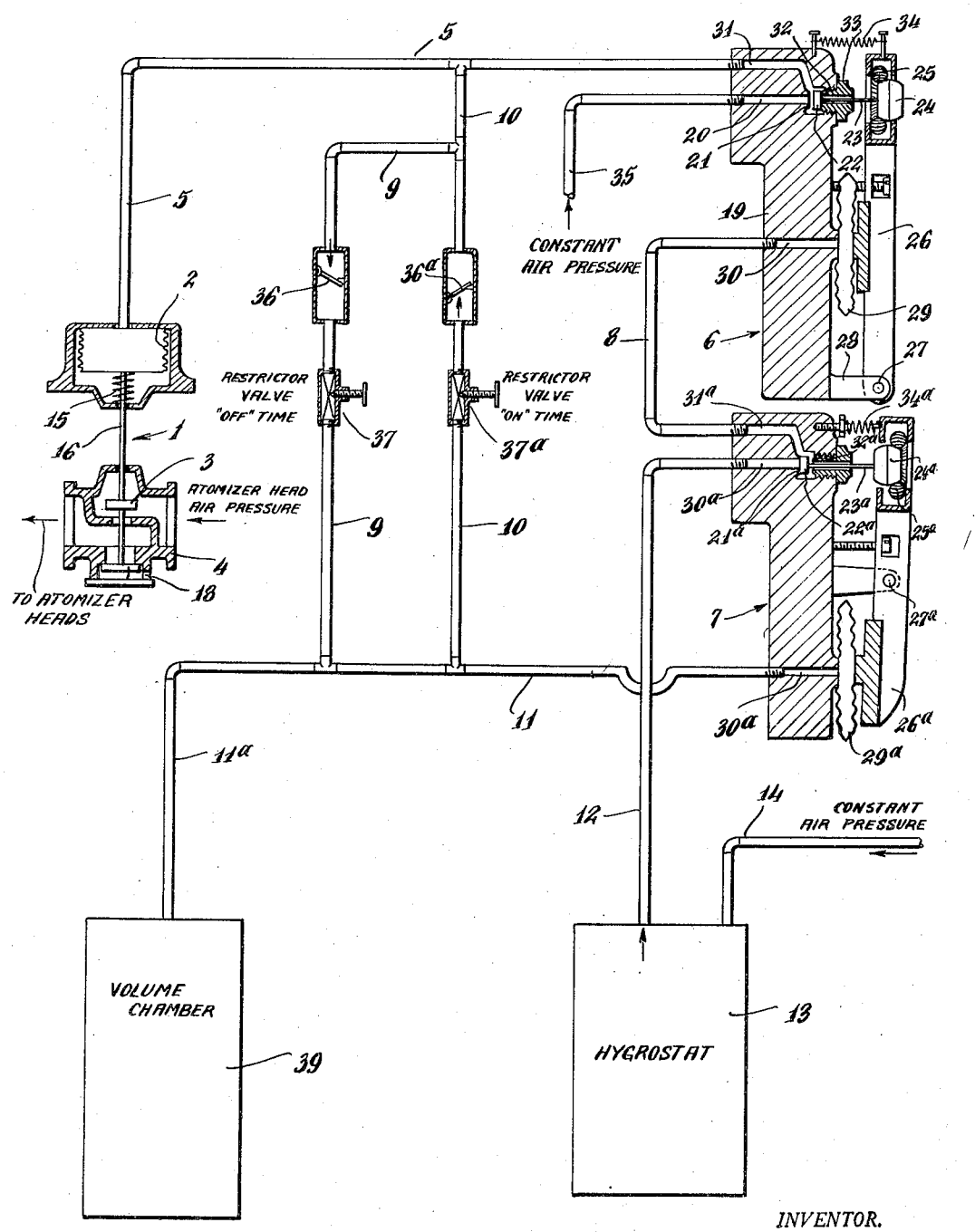

2,562,201

UNITED STATES PATENT OFFICE 2,562,201

METHOD OF AND APPARATUS FOR CONTROLLING HUMIDIFICATION OF AIR

Owen T. Merwin, Brooklyn, N. Y., assignor to Buensod-Stacey, Inc., New York, N. Y., a corporation of Delaware Application December 20, 1947, Serial No. 793,033

9 Claims. (Cl. 236—44)

The present invention relates to the method of and apparatus for controlling and maintaining humidification of the air within a given space within comparatively narrow prescribed limits.

In textile mill work and other industrial operations where the quality or working of a product is materially affected by changes in humidity in the air surrounding the station where the product is being made or operated upon, it has long been sought to control the relative humidity within prescribed narrow limits. The means usually employed were either mechanical timers for intermittently opening and shutting off atomizing spray heads, or an apparatus consisting of a hygrostat which would sense the humidity change and, acting through a pneumatically actuated relay, would operate to turn the atomizer heads on and off.

The action of an atomizer is such that it atomizes the water as finely as practicable so that the sensible heat in the air produced by machinery will vaporize the water. However, it has been always a problem to get a uniformity of humidity conditions when free water is added to the air. In actual practice it requires a very sensitive and quickly operating hygrostat, principally so that the large mass of unvaporized water coming from the atomizers does not concentrate in definite spots and therefore if the time element during which the atomizers operate is so long, say over 30 to 40 seconds, the free water will not be vaporized and will get down where the machinery is, which, of course, would lower the dry bulb quickly, thereby raising the relative humidity above the desired humidity limits.

The principal object of the present invention is to provide a control for humidity conditions within a conditioned space within very narrow limits, say ±2% of a prescribed relative humidity. This I accomplish by using a hygrostat in conjunction with an air pressure system comprising pneumatic relays, check valves and restricter valves, which function to control and limit the time intervals that the atomizers can perform their duty and also the time that they would be off duty and automatically operable means for interrupting the cycling when the humidity in the conditioned space is at the higher of the prescribed limits. By such method of cycling, over-humidification due to the dropping of globules of free water is prevented. The invention will be better understood from the detailed description which follows when considered in connection with the accompanying drawing which diagrammatically illustrates an operative arrangement of the apparatus.

The apparatus, which is mounted within the conditioned space, consists of an atomizer operating valve 1 for controlling the "on" and "off" periods of a plurality of atomizer heads (not shown) which are adapted to atomize water into the space which is to be humidity controlled or conditioned. The atomizer operating valve is controlled by air pressure acting on a bellows diaphragm 2 or other pressure-responsive means, movement of said diaphragm functioning to seat and unseat an air valve 3 in a housing 4 through which the air under pressure is adapted to pass to the atomizer heads when the air valve 3 is unseated. Automatic control of the diaphragm 2 in the atomizer operating valve is by air pressure in a pneumatic system comprising a line or conduit 5 leading to said diaphragm and connected with relays 6 and 7 through conduits 8, 9, 10 and 11, the relay 7 being also connected to a branch line 12 leading from a hygrostat 13 adapted to receive air under pressure through the conduit 14, said air pressure being the same as is supplied to the relay 6.

The atomizer operating valve 1, herein shown diagramatically, is representative of any type of blow-through diaphragm valve well known in the art, the pressure on the diaphragm 2 being counteracted by a coil spring 15 and said diaphragm being physically connected with the air valve 3 through a stem or the like 16. Also carried by the stem 16 is a second valve member 17 adapted to engage a bleed-off port 18 in the housing 4, the bleed-off port being normally closed when the valve 3 is unseated, and vice versa.

The relay 6 is of the reverse acting positive type and preferably has a narrow range of operation, for example, one-half pound pressure, and consists of a housing 19 having a port 20 therein leading to a valve seat 21 against which is adapted to seat a valve 22 carried by one end of a valve stem 23, to the opposite end of which is affixed an enlarged ball 24 adapted to move through and expand an annular coil garter spring 25 supported in a saucer frame 26 pivoted at one end 27 to a lug 28. The saucer frame 26 carries a pilot pressure-responsive means herein shown as an expansible diaphragm 29 having communication with a port 30 connected with the duct 8, the housing 19 having therein an additional port 31 connecting with the conduit 5, the inner end of said port leading to the chamber in which the valve 22 is movable. Also extending into said chamber is a second valve seat 32 formed on a plug 33 which surrounds the valve stem 23 and against which valve seat 32 the valve 22 is also adapted to seat when the pilot pressure within the expansible diaphragm 29 is below the force provided by a tension spring 34 connecting one end of the saucer frame with the casing 10. The saucer frame 26, the expansible diaphragm 29, ball 24, garter spring 25 and tension spring 34 may as a whole be considered to be a diaphragm motor for controlling the movements and seatings of the valve 22. The functioning of the reverse acting positive relay is as follows: With, say ten pounds gauge pressure and less acting on the diaphragm 29, the working mechanism would be in the position shown on the drawings. When the diaphragm pressure is increased to say ten and one-half pounds, the saucer frame 26 moves clockwise about its pivot point 27, causing the ball 24 to expand the annular coil spring 25, and when the median plane of the ball 24 passes the median plane of the spring 25, the contracting force of the spring snaps the ball to the left, causing the valve 22 to move against the seat 21. With the valve 22 in this position the inner end of port 31 is open to atmosphere through the annular space around the valve stem 23. In other words, the air pressure in the conduit 5 and acting upon the diaphragm 2 of the atomizer operating valve 1 is bled out to the atmosphere whereupon the valve member 3 will be unseated by the force of spring 15, the valve member 17 will be seated, and air under atomizing pressure from a supply source will pass through the valve housing 4 to operate the atomizer heads. At the same time constant air line pressure of say fifteen pounds (gauge indication) from the supply line 35 will likewise be closed off at the valve seat 21. However, when the air pressure in diaphragm 29 is lowered to ten pounds the spring 34 will cause the saucer member 26 to move in a counterclockwise direction and the valve 22 will be snapped back to the position shown in the drawing.

The relay 7 is of the direct acting positive type and has a range of from ten to fourteen pounds. The construction of this relay is somewhat similar to that of relay 6 and the parts of relay 7 corresponding to those of relay 6 will be designated by the same reference numerals, to which the letter $a$ has been added. In the drawing, this relay 7 is shown in its normal position with no air pressure other than atmospheric pressure acting on diaphragm 29$a$ which is connected through port 30$a$ with the line or conduit 11. In this position the valve member 22$a$ is closed against the seat 21$a$ shutting off conduit 12 and opening conduit 8 to the atmosphere around the valve stem 23$a$. When the pressure in diaphragm 29$a$ increases sufficiently to overcome the tension in the adjustable frame spring 34$a$ the saucer frame 26$a$ moves in a counter-clockwise direction around its pivot point 27$a$ expanding the annular coil spring 25$a$ over the central plane of the ball 24$a$. When the snap spring 25$a$ has passed over the central plane of the ball 24$a$ its contracting force snaps said ball to the right causing the valve 22$a$ to close against the seat 32$a$, thereby closing conduit 8 to the atmosphere and connecting said conduit with conduit 12.

Branch conduits 9 and 10 connecting conduits 5 and 11 are each provided with a check valve 36 and 36$a$ respectively opening in the direction indicated by the arrows and with a restricter valve 37 and 37$a$ respectively for controlling the "off" time interval and the "on" time interval of the atomizer operating valve 1.

The hygrostat 13 is of the reverse acting type, i. e., it will increase the air pressure in the branch line or conduit 12 on a decrease in humidity in contact with the hygroscopic element (not shown) of the hygrostat. On a rise in humidity, the pressure in the branch line 12 will be bled out through a vent (not shown). The type of hygrostat used is well known and one embodiment thereof is illustrated and described in detail in drawing 6547 in a pamphlet entitled "Instructions for Taylor Room Type Hygrostat and Relay, Copyright 1936, by Taylor Instrument Company, Rochester, New York."

Sequence of timer operation

With an excess of humidity in the atmosphere surrounding the hygrostat 13, the gauge air pressure in hygrostat branch conduit 12 will be below ten pounds which is the snap point of the reverse acting relay 6. Now by way of example let us say that branch line 12 is at zero gauge pressure, or atmospheric pressure. When such is the case, the pressure in conduit 8 must also be at zero pressure as the conduit 8 is either connected to the conduit 12 or is open to atmosphere. Diaphragm 29 is therefore also at zero pressure. As described hereinbefore, with zero pressure on diaphragm 29 the fifteen pounds air line pressure connected to port 20 is open to conduit 5. With fifteen pounds pressure on conduit 5 there is fifteen pounds pressure on the diaphragm 2 of the atomizer control valve 1 which operates to move the valve member 3 down upon its seat, cutting off the supply of air to the atomizer heads. The downward movement of the valve stem 16 which carries the valve member 3 also moves the valve disc 17 off its seat and the air pressure still on the atomizer heads side of the valve housing 4 is bled off through the now open but normally closed bleed-off port 18. With fifteen pounds pressure still in the conduit 5 the pressure in the conduits 9 and 11 will gradually build up through the downwardly opening check valve 36 and restricter valve 37. When the pressure in the conduit 11 and acting upon the expansible diaphragm 29$a$ reaches fourteen pounds, said pressure acting on diaphragm 29$a$ causes the valve 22$a$ to seat against the exhaust port seat 32$a$ and connects conduits 12 and 8 through ports 30$a$ and 31$a$. If desired, the conduits 9 and 11 may also connect through a branch or extension 11$a$ with a volume chamber 39.

The conditions described in the preceding paragraph with respect to pressures and valve positions occur with a humidity condition at the hygrostat 13 in excess of the lower of the prescribed limits.

On a drop in humidity in the atmosphere surrounding the hygrostat to below the lower of the prescribed limits for the conditioned space, the air pressure to the conduit 12 will be increased by the hygrostat. This pressure will increase gradually and will be communicated from conduit 12 through valve seat 21$a$, port 31$a$ and conduit 8 into diaphragm 29 in relay 6. When the pressure in diaphragm 29 reaches ten and one-half pounds the valve member 22 will move to the left against the valve seat 21, closing off the constant fifteen pounds air supply and exhausting the air pressure in conduit 5 through the annular space around the valve stem 23. As the air pressure drops in conduit 5 the tension provided by spring 15 upon the atomizer diaphragm 2 will snap the valve discs 17 and 3 to their normal positions, with the member 17 seated and the member 3 unseated. This permits air at thirty-five pounds pressure to again feed through the valve housing 4 to the atomizer heads and start them operating. Upon atmospheric pressure being reached in the conduit 5, the air pressure in the volume chamber 39, conduit 11 and expansible diaphragm 29$a$ will drop slowly as the air leaks back through conduit 10, restricter valve 37$a$ and check valve 36$a$ into conduit 5 and out to atmosphere through the annular space around the valve stem 23. When the pressure in diaphragm 29a drops to ten pounds, valve 22a will be snapped onto its seat 21a opening port 31a to atmosphere to bleed the air from diaphragm 29. When the air pressure in conduit 8 and expansible diaphragm 29 drops below ten pounds pressure, the valve member 22 moves to the right against the seat 32 closing off communication between port 31 and the atmosphere and allowing fifteen pounds air pressure to again enter conduit 5. From the conduit 5 this air pressure again enters the atomizer operating valve diaphragm 2 and seats the valve 3 and unseats the valve 17, thus cutting off the operation of the atomizer heads. The air in conduit 5 at fifteen pounds gage pressure starts to build up slowly in conduits 9, 11, volume chamber and expansible diaphragm 29a. The rate of air flow from conduit 5 to conduit 9 past the restricter valve 37 depends on the setting of the restricter valve 37 and the size of the volume chamber 39. Under certain conditions and adjustment of restricter valve 37 the volume chamber 39 may be omitted. When the pressure in conduit 11 and expansible diaphragm 29a builds up to fourteen pounds the valve disc 22a will again move to the right, closing off the bleed-off port through valve seat 32a and again connecting conduits 12 and 8. If the pressure in conduits 12, 8 and diaphragm 29a is still above ten and one-half pounds, the valve disc 22 will move to the left and the air in conduit 5 under fifteen pounds gage pressure will again exhaust to the atmosphere through the space around the valve stem 23.

The interval of time during which the atomizer heads can stay on depends on the setting of the restricter valve 37a, while the interval of time during which they can remain off when the hygrostat is calling for humidification is controlled by the setting of the restricter valve 37.

The operating constant air pressure supplied to the atomizer control valve and to the hygrostat may be arbitrarily chosen, however said pressure must be somewhat greater than the pressures at which the pressure-responsive members of the relays are adapted to operate. Also, the operating pressure ranges of the pressure-responsive members of the relays may be varied provided one of said pressure-responsive members operates within a narrow range.

Accordingly, while I have shown and described a single embodiment of my invention, I do not intend that such disclosure be considered as limitative of the invention since changes and substitution of parts may be made therein within the range of engineering skill without departing from the spirit of the invention.

What I claim is:

1. The method of maintaining the relative humidity of air within a given space within prescribed narrow limits, said method comprising pneumatically controlling the alternate intermittent atomizing of water into said space for a definite interval of time and cutting off said atomization for a definite interval of time to permit equalization of the vapor pressure in said space produced by such addition of water, and automatically interrupting said intermittent atomizing of water into said space by a hygrostat pneumatic control in said space when the relative humidity in said space is at the higher of the prescribed limits and again restoring the intermittent atomizing of water into said space when said relative humidity drops to the lower of the prescribed limits.

2. An apparatus for controlling and maintaining the relative humidity of air within a given space within prescribed limits, comprising a pneumatically controllable system including therein an atomizer control valve, pneumatic pressure-responsive means for opening and closing said valve, and a hygrostat, said pneumatic pressure-responsive means being operative to automatically open and close the atomizer control valve at definitely timed intervals to alternately atomize water into the given space and to cut off such atomization, and said hygrostat being operative to control the flow of air in the pneumatically controlled system to interrupt said intermittent opening of the atomizer control valve when the relative humidity in the given space is at the higher of the prescribed humidity limits.

3. An apparatus for controlling and maintaining the relative humidity of air within a given space within prescribed limits, comprising a pneumatically controllable system including therein an atomizer control valve, two relays each having a valve and a pneumatic pressure responsive means for opening and closing said valve, and a hygrostat, said relays being connected in series and operative to automatically open and close the atomizer control valve at definitely timed intervals to alternately atomize water into the given space and to cut off such atomization, and said hygrostat being operative to control the flow of air in the pneumatically controlled system to interrupt said intermittent opening of the atomizer control valve when the relative humidity in the given space is at the higher of the prescribed humidity limits.

4. An apparatus according to claim 3 wherein the pneumatically controlled system includes two branch conduits connecting the pneumatic pressure supply line to the atomizer control valve with the pressure-responsive element of one of the relays, each branch conduit having a check valve and a restricter valve therein, and the check valve in the respective branch conduits opening to air pressure flow in opposite directions.

5. An apparatus according to claim 3 wherein one of the relays has a valved port connecting with a source of constant air pressure and adapted to supply such air pressure to the atomizer control valve, and the pressure-responsive means of said relay is connected through the valve of the second relay to a conduit through which the passage of air is controlled by the hygrostat, the pressure-responsive member of the first relay being operative through a pressure range of less than one pound to open and close the valve of said relay and the pressure-responsive member of the second relay being operative through a pressure range of several pounds to open and close the valve of the second relay.

6. An apparatus according to claim 3 wherein one of the relays has a valve port connecting with a source of constant air pressure and adapted to supply such air pressure to the atomizer control valve, and the pressure-responsive means of said relay is connected through the valve of the second relay to a conduit through which the passage of air is controlled by the hygrostat, the pressure-responsive member of the second relay being adapted to receive pressure through a branch conduit from the constant air pressure being supplied to the atomizer control valve, said branch conduit having therein a check valve and a restricter valve, said check valve being adapted to open under the constant air pressure and said restricter valve being adapted to control the "off" time operation of the atomizer control valve.

7. For use in apparatus for controlling and maintaining the relative humidity of air within a given space, comprising a pneumatically controlled system including an atomizer control valve and a hygrostat adapted to control the flow of air in the pneumatically controlled system to open and close the atomizer control valve in response to relative humidity conditions at the hygrostat; a pneumatically controlled unit adapted for connection within said pneumatic system to automatically alternately open and close the atomizer control valve for definite time intervals, said unit comprising a relay adapted for connection in said system between the hygrostat and the atomizer control valve and two branch conduits adapted for connection between the relay and the conduit leading to the atomizer control valve, said relay having a valve and a pneumatic pressure-responsive member for opening and closing said valve, one end of each of the branch conduits being adapted for connection with the conduit leading from the relay to the atomizer control valve and the other ends of the branch conduits being adapted for connection to the pneumatic pressure-responsive member of the relay and each branch conduit having therein a check valve and a restricter valve, with the check valves in the respective branch conduits opening to air pressure flow in opposite directions.

8. For use in apparatus for controlling and maintaining the relative humidity of air within a given space, comprising a pneumatically controlled system including an atomizer control valve and a hygrostat adapted to control the flow of air in the pneumatically controlled system to open and close the atomizer control valve in response to relative humidity conditions at the hygrostat; a pneumatically controlled unit adapted for connection within said pneumatic system to automatically alternately open and close the atomizer control valve for definite time intervals, said unit comprising two relays in series adapted for connection in said system between the hygrostat and the atomizer control valve, each of said relays having a valve and a pneumatic pressure-responsive member for opening and closing said valve, two branch conduits adapted for connection between the conduit leading from the first relay to the atomizer control valve and the second relay, one end of each of the branch conduits being adapted for connection with the conduit leading from the first relay to the atomizer control valve and the other end of the branch conduits being adapted for connection to the pneumatic pressure-responsive member of the second relay, each branch conduit having therein a check valve and a restricter valve with the check valves in the respective branch conduits opening to air pressure flow in opposite directions.

9. An apparatus for controlling humidification of air within a given space within prescribed limits comprising a pneumatically controlled system including therein an atomizer control valve, a hygrostat, a source of constant air pressure and two pneumatic relays the valves of which are operable by pilot pressure less than the constant air pressure, said relays being adapted to operate the atomizer control valve to alternately atomize water into the given space and cut off such atomization, one relay being adapted to supply air at constant pressure to the atomizer control valve and receive pilot pressure from the hygrostat through the second relay, the pressure-responsive member of said second relay being connected through two branch conduits with the constant air pressure being supplied to the atomizer control valve, a check valve and a restricter valve in each of said branch conduits, the check valve in one branch conduit opening to the constant pressure and the restricter valve in said conduit controlling the "off" time of the atomizer control valve, the check valve in the other branch conduit closing to the constant pressure and opening to pilot pressure from said second relay and the restricter valve in said second branch controlling the "on" time of the atomizer control valve.

OWEN T. MERWIN.

REFERENCES CITED

The following references are of record in the file of this patent:

UNITED STATES PATENTS

| Number | Name | Date |
|---|---|---|
| 1,270,159 | Hodge | June 18, 1918 |
| 1,513,727 | Krick | Oct. 28, 1924 |
| 1,597,349 | Fortier | Aug. 24, 1926 |
| 1,758,494 | Behr | May 13, 1930 |
| 1,860,377 | Anderson | May 31, 1932 |
| 2,285,540 | Stein | June 9, 1942 |
| 2,387,562 | Brunot | Oct. 23, 1945 |